United States Patent Office 2,766,862
Patented Oct. 16, 1956

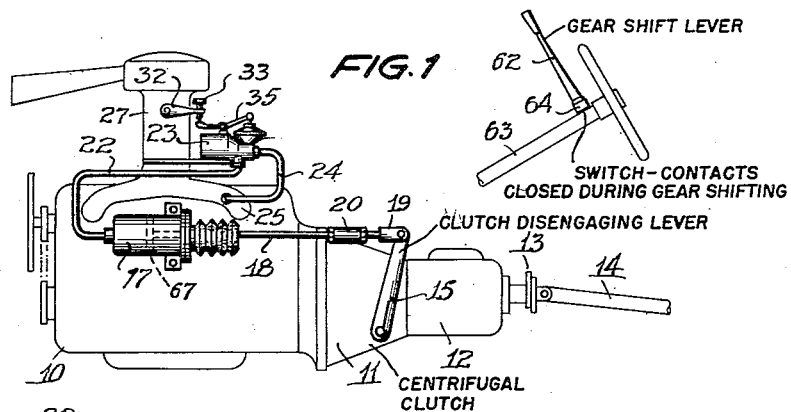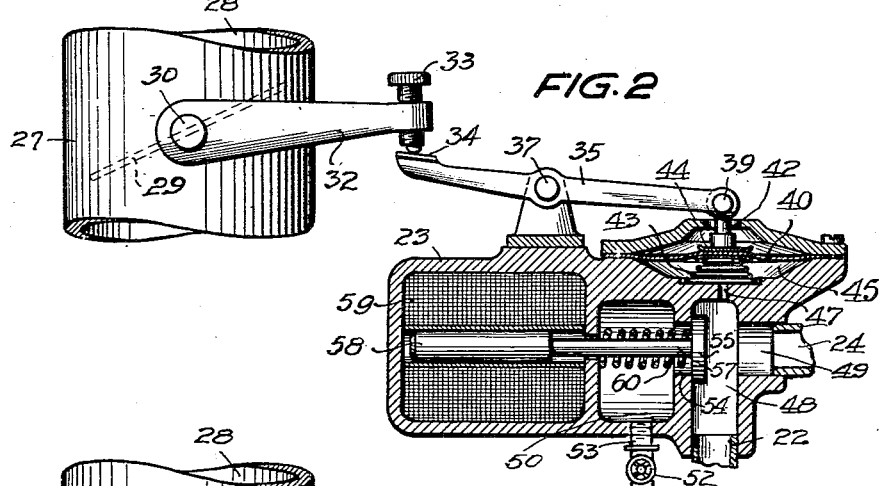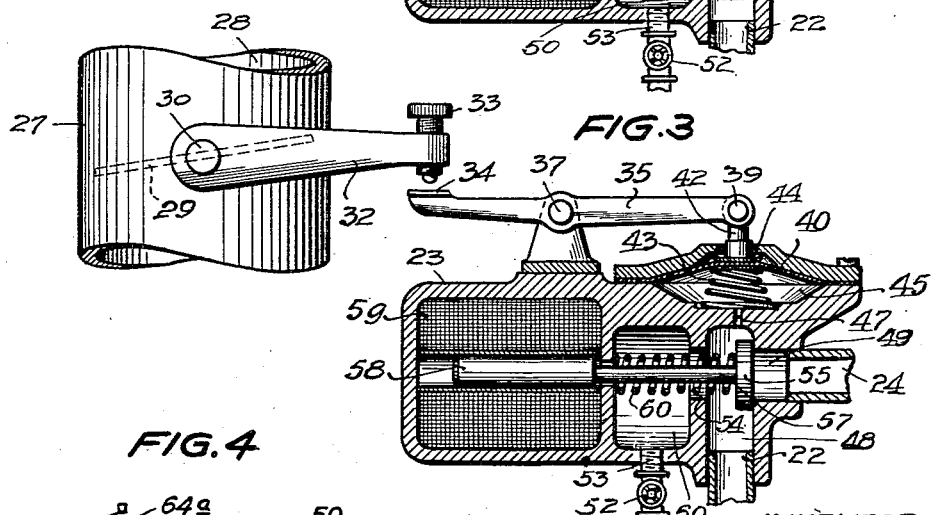

2,766,862

MOTOR SPEED CONTROL FOR USE WITH AUTOMATIC CLUTCHES

Richard Binder, Schweinfurt am Main, Germany, assignor to Fichtel & Sachs A. G., Schweinfurt am Main, Germany, a corporation of Germany Application March 4, 1955, Serial No. 492,153

6 Claims. (Cl. 192—.08)

The present invention relates to an engine speed control device for use with automatic clutches, the speed control device being arranged to maintain the engine speed sufficiently high to assure smooth reengagement of the clutch after its disengagement during gear shifting.

An automatic clutch control system of the type with which the present invention is suitable for use is described in the pending application of Richard Binder, Serial No. 466,410 filed November 2, 1954.

The invention contemplates the use of a clutch which automatically becomes engaged whenever the engine speed exceeds a predetermined minimum value. During gear shifting, a power actuated device disengages the clutch when it would otherwise be engaged and thereafter allows it to reengage smoothly after the gear shifting has been completed. Usually, the power actuated disengaging device is controlled by an electric circuit including a switch associated with the gear shift lever. The clutch may be of the centrifugal type, a speed-controlled electro-magnetic clutch controlled by the generator voltage, for instance, or the clutch may be operated by a servomotor of the fluid pressure type such as a vacuum, compressed air or hydraulic device, or may comprise an engaging and disengaging device operated by an electric motor.

The use of an automatic clutch of this type makes the use of a clutch pedal unnecessary. However, if the engine speed is permitted to drop during gear shifting, the clutch will disengage not only by operation of the power actuated disengaging device but also due to the speed reduction of the engine. Reengagement will then tend to be jerky, particularly when shifting back from a higher gear to lower gear. When driving on icy or slippery pavements, this action may be hazardous, tending to throw the vehicle into a skid.

The present invention comprises a speed control device which maintains the engine speed high enough so that the clutch will be disengaged only by operation of the power actuated disengaging device and not by the speed-control disengaging device during the shifting of gears. A smooth reengagement of the clutch by the power actuated disengaging device is therefore assured without any possibility of interference from the speed-controlled disengaging device. Conveniently, the minimum speed control device may act on the engine throttle to prevent the engine from dropping to idling speed.

Various objects, features and advantages of the invention will become apparent upon reading the following specification together with the accompanying drawing forming a part hereof.

Referring to the drawing:

Figure 1 is a diagrammatic elevational view showing an illustrative embodiment of the invention.

Figure 2 is an enlarged elevational view of a minimum speed control device shown partly in section, the device being shown in its operated position preventing the engine from dropping to idling speed.

Figure 3 is a view similar to Fig. 2 showing the minimum speed control device in its inoperative position in which position it has no effect upon the engine speed.

Figure 4 is a schematic circuit diagram illustrating the electrical connections between the speed control device and electrical control contacts which are included in a switch actuated by the gear shift lever while shifting from one gear ratio to another.

Referring to Fig. 1, the invention is shown applied to a motor vehicle of which only those portions which are directly concerned with the present invention are shown. An internal combustion engine designated generally as 10 is connected through a centrifugal clutch 11 and a transmission 12 to an automative drive or propeller shaft 13 which extends rearwardly to a differential or other driving mechanism (not shown). The connection to the differential includes the usual universal joint 14. The centrifugal clutch 11 may be of the type shown in the application of Richard Binder, Serial No. 466,410 filed November 2, 1954, (Figs. 2 and 3) or it may take any other desired form in which the clutch becomes engaged whenever the engine speed exceeds a predetermined minimum speed, but the clutch will always be disengaged whenever the engine speed drops below this predetermined minimum speed, for instance to idling speed. A master clutch disengaging lever 15 forms a part of the clutch 11 and when rotated in a counterclockwise direction as viewed in Fig. 1, the lever 15 will always disengage clutch 11 even though the engine speed may be considerably higher than the predetermined minimum clutch engaging speed.

A vacuum operated cylinder 17 is mounted on one side of engine 10. Vacuum cylinder 17 actuates a pull rod 18 which is pivotally connected by a coupling 19 to the upper free end of master clutch control lever 15. A turnbuckle type of coupling 20 is included in pull rod 18 to permit adjustment of the action of vacuum cylinder 17 with respect to clutch 11.

A suction line 22 connects the vacuum cylinder 17 to an electrically actuated control valve 23. A further suction line 24 connects the control valve 23 with the intake manifold 25 of the engine 10.

The intake manifold 25 is supplied with a combustible air-fuel mixture from a carburetor 27 through a supply duct 28. The supply duct 28 has a butterfly throttle valve member 29 disposed therein, the throttle valve member 29 being carried by a throttle shaft 30 for rotation therewith to control and vary the speed of engine 10. The throttle shaft 30 has a special control arm 32 mounted thereon, the usual accelerator pedal controlled arm being omitted from the drawing for simplicity of illustration.

The free end of control arm 32 carries an adjustment screw 33. The lower end of adjustment screw 33 is engageable with the free left hand end 34 of a minimum speed control lever 35 mounted on the body of the control valve 23. The speed control lever 35 is pivoted intermediate its ends on a pivot pin 37 supported by a pedestal 38 mounted on the body of control valve 23. The right hand end of speed control lever 35 is pivotally connected at 39 to be controlled by a flexible diaphragm 40 through a link member 42 which is yieldingly urged upwardly by a helical compression spring 43. The diaphragm 40 is peripherally secured to the body of control valve 23 by a centrally apertured cover plate 44 which limits the upward movement of diaphragm 40 while permitting link member 42 to pass freely therethrough. The diaphragm 40 thus defines in part a vacuum chamber 45 which communicates through a metering orifice 47 with a valve chamber 48 with which the suction line 22 is in continuous communication. A suction passage 49 is connected by suction line 24 with intake manifold 25, and while engine 10 is running, passage 49 will ordinarily be under suction from intake manifold 25.

Disposed at the left of valve chamber 48 is an atmospheric pressure chamber 50. Air is admitted to atmospheric pressure chamber 50 through an adjustable regulating valve 52 and an air line 53. Atmospheric pressure chamber 50 communicates with valve chamber 48 through an aperture 54 formed in the body of control valve 23.

A horizontally movable valve member 55 is disposed in valve chamber 48. Valve member 55 is carried by a valve rod 57 connected to a magnetic plunger 58 which is slidably disposed in a solenoid winding 59. A helical compression spring 60 which passes through aperture 54 and surrounds valve rod 57 yieldingly urges the valve member 55 and magnetic plunger 58 toward the right to close off suction passage 49 and cause valve chamber 48, vacuum chamber 45 and suction line 22 to cylinder 17 to remain normally at atmospheric pressure.

The transmission 12 is controlled in the usual manner by a gear shift lever 62 mounted on the steering column 63. Operatively associated with gear shift lever 62 is a clutch control switch 64 comprising electrical control contacts 64a (Fig. 4) which are closed whenever gear shifting is in progress. The clutch control 64a contacts are included in an energizing circuit for control valve 23, as shown in Fig. 4. This energizing circuit comprises the usual grounded battery 66, the control contacts 64a and the solenoid winding 59, one terminal of the winding 59 being grounded to complete the circuit from battery 66 through contacts 64a.

Energization of the solenoid winding 59 draws magnetic plunger 58 toward the left to the position shown in Fig. 2, thus moving valve member 55 from the position shown in Fig. 3 to the position shown in Fig. 2. This connects valve chamber 48 with suction line 24 at the same time disconnecting valve chamber 48 from atmospheric pressure chamber 50 by closure of aperture 54. This action connects vacuum cylinder 17 with intake manifold 25 through suction lines 22 and 24 and control valve 23. Application of suction to vacuum cylinder 17 causes its piston 67 to move toward the left at the same time rotating master clutch disengaging lever 15 in a counter-clockwise direction, thereby disengaging the centrifugal clutch 11.

At the same time, the connection of valve chamber 48 to such line 24 causes a pressure reduction through metering orifice 47 in vacuum chamber 45 drawing flexible diaphragm 40 downwardly against the pressure of spring 43. Link member 42 moves downwardly causing clockwise rotation of speed control lever 35 on its pivot pin 37. The free end 34 of speed control lever 35 moves upwardly engaging the lower end of adjustment screw 33 and moving the free end of throttle control arm 32 upwardly. The upward movement of the end of throttle control arm 32 is accompanied by a counterclockwise rotation of throttle shaft 30 and corresponding counter-clockwise rotation of butterfly valve member 29 increasing the flow of air-fuel mixture to intake manifold 25 and increasing the speed of engine 10 to a speed higher than the speed of disengagement of centrifugal clutch 11. Of course, if the accelerator pedal calls for an engine speed higher than the minimum speed called for by the upward movement of the free end 34 of minimum speed control lever 35, then the accelerator pedal will prevail and the engine 10 will operate at the higher of the two speeds. On the other hand, however, if the accelerator pedal calls only for idling speed, the minimum speed control lever 35 will prevail and bring the engine 10 up to a speed sufficient to insure smooth and gradual reengagement of clutch 11 by vacuum cylinder 17 acting alone and without interference from the centrifugal control mechanism of the clutch.

Upon the opening of contacts 64a and the accompanying deenergization of the solenoid winding 59 after gear shifting has been completed, valve member 55 moves toward the right under the influence of compression spring 60, reclosing the suction passage 49 and opening the aperture 54 so that valve chamber 48 again communicates with atmospheric pressure chamber 50. Air is thereupon admitted to atmospheric pressure chamber 50 at a gradual and controlled restricted rate through the regulating valve 52 and the air line 53. This assures a smooth reengagement of centrifugal clutch 11 at a rate determined by the setting of adjustable regulating valve 52. Similarly, minimum speed control lever 35 will gradually allow control of the throttle to be restored to the accelerator pedal or other throttle control device.

I have shown what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. In combination with an internal combustion engine; throttle means for controlling the speed of said engine; a transmission; gear shifting means for selecting a desired gear ratio within said transmission; a clutch selectively engageably and disengageably connecting said engine to said transmission; means responsive to the speed of said engine for causing engagement of said clutch whenever said engine speed exceeds a predetermined minimum speed; and means responsive to gear shifting actuation of said gear shift means for causing disengagement of said clutch during said gear shifting actuation during times when said engine speed exceeds said predetermined speed; the provision of minimum speed control means controlled by said gear shifting means along with said clutch disengaging means, said minimum speed control means acting on said throttle means to maintain said engine speed above said predetermined minimum speed during said shifting actuation of said gear shifting means.

2. In combination with an internal combustion engine; throttle means for controlling the speed of said engine; a transmission; gear shifting means for selecting a desired gear ratio within said transmission; a clutch selectively engageably and disengageably connecting said engine to said transmission; means responsive to the speed of said engine for causing engagement of said clutch whenever said engine speed exceeds a predetermined minimum speed; and fluid pressure actuated means for causing disengagement of said clutch during times when said engine speed exceeds said predetermined speed; the provision of fluid pressure actuated minimum speed control means acting on said throttle means to maintain said engine speed higher than said predetermined minimum speed; and valve means common to both of said fluid pressure actuated means and controlled by said gear shifting means during gear shifting actuation thereof for simultaneously causing disengagement of said clutch and maintaining said engine above said minimum speed during said gear shifting actuation of said gear shift means.

3. The combination according to claim 2, further comprising fluid flow rate regulating means connected with said clutch disengaging means through said valve means for restricting the rate of change in the fluid pressure acting on said clutch disengaging fluid pressure actuated means, said flow rate regulating means restricting said rate of pressure change in said clutch disengaging fluid pressure actuated means after completion of said gear shifting actuation of said gear shift means for causing a smooth and gradual reengagement of said clutch.

4. The combination according to claim 3, wherein said fluid flow rate regulating means is further connected with said minimum speed control fluid pressure actuated means through said valve means to restrict the rate of change in the fluid pressure acting on both of said fluid pressure actuated means for delaying any speed reduction of said engine below said minimum speed until after reengagement of said clutch by said clutch disengaging fluid pressure actuated means.

5. In combination with an internal combustion engine having an intake manifold; throttle means connected with said intake manifold for controlling the speed of said engine; a transmission; gear shifting means for selecting a desired gear ratio within said transmission; a clutch selectively engageably and disengageably connecting said engine to said transmission; means responsive to the speed of said engine for causing engagement of said clutch whenever said engine speed exceeds said predetermined minimum speed; and suction operated means connected with said clutch for causing disengagement thereof during times when said engine speed exceeds said predetermined minimum speed; the provision of suction operated minimum speed control means acting on said throttle means to maintain said engine speed at a speed higher than said predetermined minimum speed; electrically actuated valve means controlled by said gear shifting means; and a suction line extending from said intake manifold to said valve means, said valve means connecting said suction line to both of said suction operated means during shifting actuation of said gear shifting means for simultaneously disengaging said clutch and maintaining the speed of said engine higher than said minimum speed during said shifting actuation of said gear shifting means.

6. The combination according to claim 5, further comprising air flow rate regulating means interposed between the atmosphere and said valve means for delaying the restoration of atmospheric pressure to both of said suction operated means.

References Cited in the file of this patent

UNITED STATES PATENTS

| | | |
|---|---|---|
| 2,568,958 | Hey et al. | Sept. 25, 1951 |
| 2,622,711 | Chambonneau | Dec. 23, 1952 |
| 2,695,088 | Bradbury | Nov. 23, 1954 |